United States Patent
Qi et al.

(10) Patent No.: US 10,210,564 B2
(45) Date of Patent: Feb. 19, 2019

(54) VIEWING PRODUCT IMAGES IN REAL-SIZE

(71) Applicant: International Business Machines Corporation, Armonk, NY (US)

(72) Inventors: Yanhong Qi, Beijing (CN); Hong Chuan Yuan, Beijing (CN); Jin Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 461 days.

(21) Appl. No.: 14/928,479

(22) Filed: Oct. 30, 2015

(65) Prior Publication Data

US 2017/0124636 A1    May 4, 2017

(51) Int. Cl.
    *G06Q 30/00*    (2012.01)
    *G06Q 30/06*    (2012.01)
    *H04N 9/31*     (2006.01)
    *G06K 9/00*     (2006.01)

(52) U.S. Cl.
    CPC ..... *G06Q 30/0643* (2013.01); *G06K 9/00671* (2013.01); *H04N 9/3185* (2013.01); *H04N 9/3194* (2013.01)

(58) Field of Classification Search
    CPC .......................................... G06Q 30/06–30/08
    USPC ............................................... 705/26.1–27.2
    See application file for complete search history.

(56) References Cited

U.S. PATENT DOCUMENTS

| 2010/0134594 | A1* | 6/2010 | Xuan | G06T 3/40 348/46 |
| 2010/0295869 | A1* | 11/2010 | Apted | G06T 1/0007 345/642 |
| 2015/0120503 | A1* | 4/2015 | Zamer | G06Q 30/0623 705/26.61 |
| 2015/0206292 | A1* | 7/2015 | Masuko | H04N 9/3185 705/27.2 |

FOREIGN PATENT DOCUMENTS

| CN | 106652006 A | 5/2017 |
| EP | 2385492 A1 | 11/2011 |

OTHER PUBLICATIONS

Hulst, P., "Size Does Matter: LifeSizer Solves an Age Old Problem, Websites Can Finally Display Actual Size Product Images", Lifesizer Blog, Posted Jun. 5, 2012, Printed on: Jul. 10, 2015, 4 pages, <http://www.lifesizer.com/blog/category/blog/>. Copyright 2015 LifeSizer, Inc.

\* cited by examiner

*Primary Examiner* — Ethan D Civan
(74) *Attorney, Agent, or Firm* — William H. Hartwell (57) ABSTRACT

Embodiments provide a method for viewing online products in real-size. The method includes a computing device receiving one or more instructions to view an image of an online product in real-size on a selected surface. The device then determines one or more dimensions of the online product and projects the image of the online product on the selected surface, where one or more dimensions of the projected image are equal to the one or more dimensions of the online product.

25 Claims, 10 Drawing Sheets

VIEWING PRODUCT IMAGES IN REAL-SIZE

BACKGROUND

The present invention relates generally to image processing, and more particularly to generating real-size product images.

A projector or image projector is an optical device that projects an image (or moving images) onto a surface, commonly a projection screen. Many projectors create an image by shining a light through a small transparent lens, but some newer types of projectors can project the image directly, by using lasers. A virtual retinal display, or retinal projector, is a projector that projects an image directly on the retina instead of using an external projection screen. A common type of projector used today is called a video projector. Video projectors are digital replacements for earlier types of projectors such as slide projectors and overhead projectors. These earlier types of projectors were mostly replaced with digital video projectors throughout the 1990s and early 2000s (decade), but old analog projectors are still used in some cases. Some newer types of projectors include handheld projectors that use lasers or LEDs to project images.

SUMMARY

In one embodiment, a method, computer program product, and/or system for viewing products in real-size is provided. In this embodiment, a computing device receives one or more instructions to view an image of an online product in real-size on a selected surface. The device then determines one or more dimensions of the online product and projects the image of the online product on the selected surface, wherein one or more dimensions of the projected image are equal to the one or more dimensions of the online product.

In another embodiment, a method for viewing products in real-size is provided. The method includes a computing device receiving one or more instructions to view an image of an online product in real-size on a selected surface using an electronic device capable of projection. The computing device then determines one or more dimensions of the online product and measures a distance between the electronic device and the selected surface. The computing device then calculates a projection focal length to project the image of the online product on the selected surface. The computing device then projects the image of the online product on the selected surface using the determined dimensions, the measured distance, and the calculated focal length, wherein one or more dimensions of the projected image are equal to the one or more dimensions of the online product. An advantage of this embodiment, for example, is that it enhances the user experience for online shopping by utilizing projectors embedded or installed in electronic devices.

In another embodiment, a method for viewing products in real-size is provided. The method includes a computing device receiving one or more instructions to view an image of an online product in real-size on a selected surface using an electronic device capable of projection. The computing device then determines one or more dimensions of the online product, wherein the one or more dimensions of the online product are parsed from one of: a product description of the online product and a framed area selected by a user. The computing device then captures an image using a camera installed in the electronic device, wherein the camera is focused on the selected surface, retrieves a camera focal length and a camera image distance used by the camera to capture the image, and calculates the distance between the electronic device and the selected surface, using the retrieved camera focal length and camera image distance. The computing device then determines one or more dimensions of the image and calculates a projection focal length using the determined one or more dimensions of the image, the determined one or more dimensions of the online product, and the calculated distance between the electronic device and the selected surface. The computing device then projects the image of the online product on the selected surface using the determined dimensions, the calculated distance, and the calculated projection focal length, wherein one or more dimensions of the projected image are equal to the one or more dimensions of the online product. An advantage of this embodiment, for example, is that it uses existing camera autofocus capabilities to determine measurements that are useful in calculating projection settings (such as focal length) for projecting the image on the selected surface.

DETAILED DESCRIPTION

Embodiments in accordance with the present invention recognize that online shopping has gained popularity because of its convenience. Online commerce, also referred to as online shopping, is a form of electronic commerce (i.e., e-commerce), which allows consumers to directly buy goods or services from a retailer (i.e., e-web-store, e-shop, e-store, Internet shop, web-shop, web-store, online store, online storefront and virtual store), over an Internet connection using an application such as a web browser. Mobile commerce, also referred to as m-commerce, includes purchasing from an online retailer's mobile optimized online site or app. In many online and mobile commerce applications, however, it can be difficult for users to envision the actual dimensions of products being viewed. Online shopping users often complain about their failures in online-purchased products. Some failures are caused by the discrepancies between the sizes of pictures and those of real products. Although most online products have sizes listed as measurements, users often ignore them and judge the sizes by viewing only pictures. Also, it is very hard for some users to imagine the exact dimensions of products with only a couple of numbers and without rulers in hand. Embodiments described in the present invention solve this problem by utilizing projectors embedded/installed in electronic devices, therefore enhancing the user experience of online shopping. When users navigate online products and show interest in one, they can choose to project its picture onto any flat surfaces. Then the real-sized picture appears on the surface and users can see the picture as if they were seeing the real product.

Figure 1:
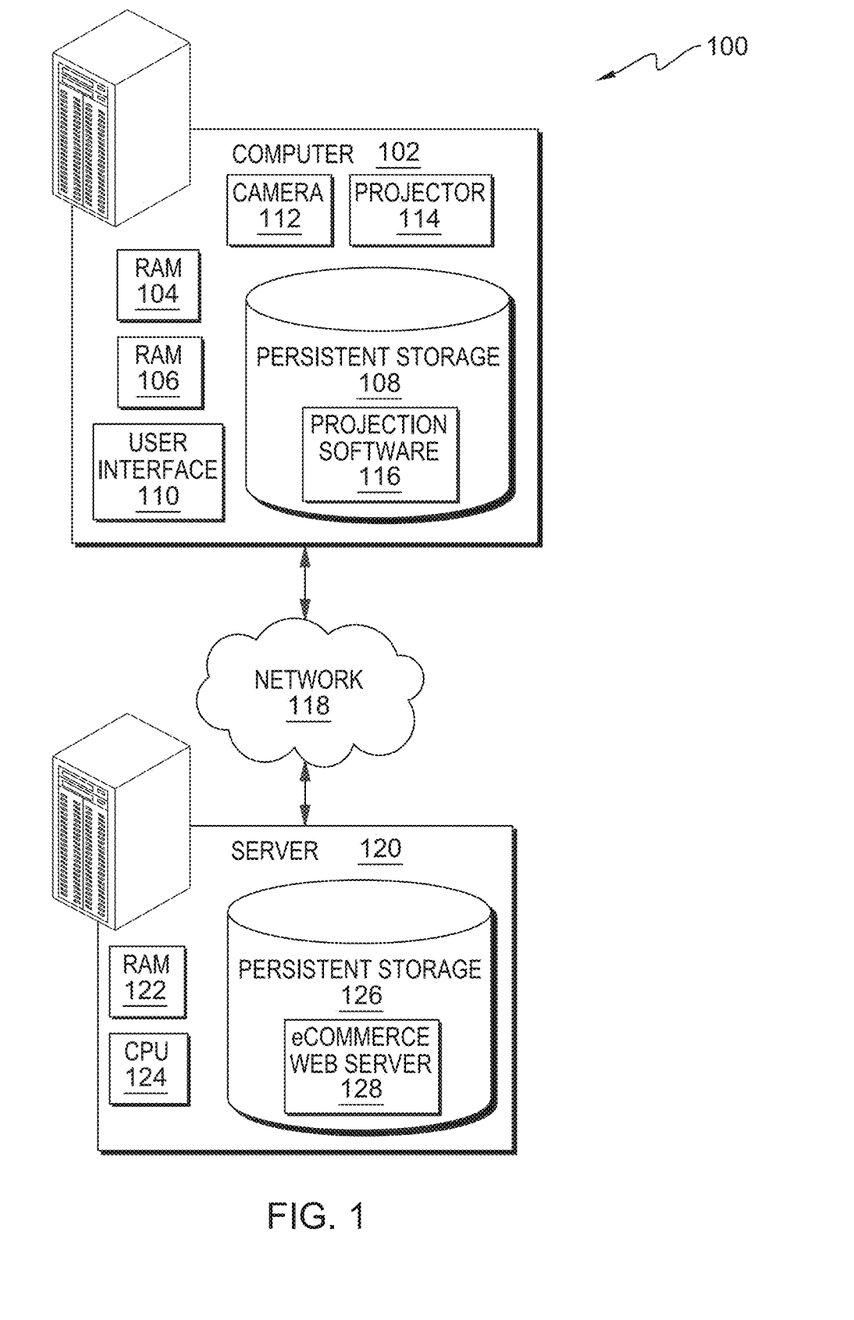
FIG. 1 is a functional block diagram illustrating an e-commerce environment, in an embodiment in accordance with the present invention.

Embodiments in accordance with the present invention will now be described in detail with reference to the Figures. FIG. 1 is a functional block diagram, generally designated 100, illustrating an e-commerce environment, in an embodiment in accordance with the present invention.

E-commerce environment 100 includes computer 102 and server 120, interconnected over network 118. Computer 102 includes random access memory (RAM) 104, central processing unit (CPU) 106, persistent storage 108, user interface 110, camera 112, and projector 114. Computer 102 may be a web server, or any other electronic device or computing system, capable of processing program instructions and receiving and sending data. In some embodiments, computer 102 may be a laptop computer, a tablet computer, a netbook computer, a personal computer (PC), a desktop computer, a personal digital assistant (PDA), a smart phone, or any programmable electronic device capable of communicating over a data connection to network 118. In other embodiments, computer 102 may represent server computing systems utilizing multiple computers as a server system, such as in a distributed computing environment. In general, computer 102 is representative of any electronic devices or combinations of electronic devices capable of executing machine-readable program instructions and communicating with server 120 via network 118 and with various components and devices within e-commerce environment 100.

Computer 102 includes persistent storage 108. Persistent storage 108 may, for example, be a hard disk drive. Alternatively, or in addition to a magnetic hard disk drive, persistent storage 108 may include a solid state hard drive, a semiconductor storage device, read-only memory (ROM), erasable programmable read-only memory (EPROM), flash memory, or any other computer-readable storage medium that is capable of storing program instructions or digital information. In accordance with embodiments, projection software 116 is stored in persistent storage 108, which also includes operating system software, as well as software that enables computer 102 to communicate with server 120, as well as other computing devices over a data connection on network 118. Projection software 116 is used to measure the distance between computer 102 and a selected surface where a product image is to be displayed. The selected surface may be any surface the user may want to project an image of an online product on. Some examples of a selected surface include, but are not limited to, the following: (i) a wall, (ii) a door, (iii) a ceiling, and (iv) a floor. Projection software 116 detects the distance between the device and the image plane and calculates the focal length and image distance. In another example embodiment, a laser (not shown), installed in computer 102, may be used for distance detection by measuring the time it takes for light emitted from the laser and returned from the target. In one example embodiment, projection software may be a set of application programming interfaces (APIs) designed to be used in a client side or server side applications such as a web browser plugin or a mobile phone app. For example, a user of computer 102 may install a plugin in a web browser to allow the web browser to project product images in real-size via the installed plugin. In computer programming, an API is a set of routines, protocols, and tools for building software applications. In another example embodiment, projection software 116 may be used for a Smart TV. A smart TV, also referred to as a connected TV or hybrid TV, is a television set or set-top box with integrated Internet and Web 2.0 features, and is an example of technological convergence between computers and television sets and set-top boxes. In addition to the traditional functions of television sets and set-top boxes provided through traditional broadcasting media, Smart TV devices can also provide Internet TV, online interactive media, over-the-top content, as well as on-demand streaming media, and home networking access. For example, a user of a Smart TV may install projection software 116 or an API or plugin that incorporates projection software 116, to display products in real-size on the Smart TV, or project the images using a built-in projector installed in the Smart TV.

Computer 102 also includes user interface 110. User interface 110 is a program that provides an interface between a user of computer 102 and a plurality of applications that reside on computer 102 (e.g., projection software 116), and/or applications on computing devices that may be accessed over a data connection on network 118. A user interface, such as user interface 110, refers to the information (e.g., graphic, text, sound) that a program presents to a user and the control sequences the user employs to control the program. User interface 110 is a type of interface that allows users to interact with peripheral devices (i.e., external computer hardware that provides input and output for a computing device, such as a keyboard and mouse) through graphical icons and visual indicators as opposed to text-based interfaces, typed command labels, or text navigation. The actions in GUIs are often performed through direct manipulation of the graphical elements. A variety of types of user interfaces exist. In one embodiment, user interface 110 is a graphical user interface (GUI). In another embodiment, user interface 110 may be a web user interface (WUI) and can display text, documents, web browser windows, user options, application interfaces, and instructions for operation, and includes the information (such as graphic, text, and sound) that a program presents to a user and the control sequences the user employs to control the program. User interface 110 may also be mobile application software that provides an interface between a user of computer 102 and server 120, and other devices (not shown), over a data connection on network 118. Mobile application software, or an "app," is a computer program designed to run on smart phones, tablet computers and other mobile devices. User interface 110 enables a user of computer 102, and projection software 116, to measure distances between computer 102 and selected surfaces, and project images of products.

Computer 102 also contains camera 112. Camera 112 is used by projection software 116 to detect the distance between the device and the image plane. For example, computer 102 will capture an image of the desired surface and calculate the distance to the desired surface using the focal length and image distance. In one example embodiment, computer 102 may be equipped with infrared (IR) sensor to determine the distance to a selected surface by detecting the energy given off by the selected surface. In other example embodiments, computer 102 may include an ultrasonic distance sensor to determine the distance to a selected surface. The ultrasonic distance sensor may trigger an ultrasonic burst (well above human hearing) and then "listen" for the echo return pulse. The ultrasonic distance sensor would then measure the time for the echo to return.

Projector 114 is used to project images on a selected surface in real-size dimensions determined by projection software 116. Projector 114 may be contained in a laptop computer, a tablet computer, a netbook computer, a personal computer (PC), a desktop computer, a personal digital assistant (PDA), a smart phone, or any programmable electronic device capable of communicating over a data connection on network 118 with server 120 or other devices (not shown) within e-commerce environment 100.

Figure 8:
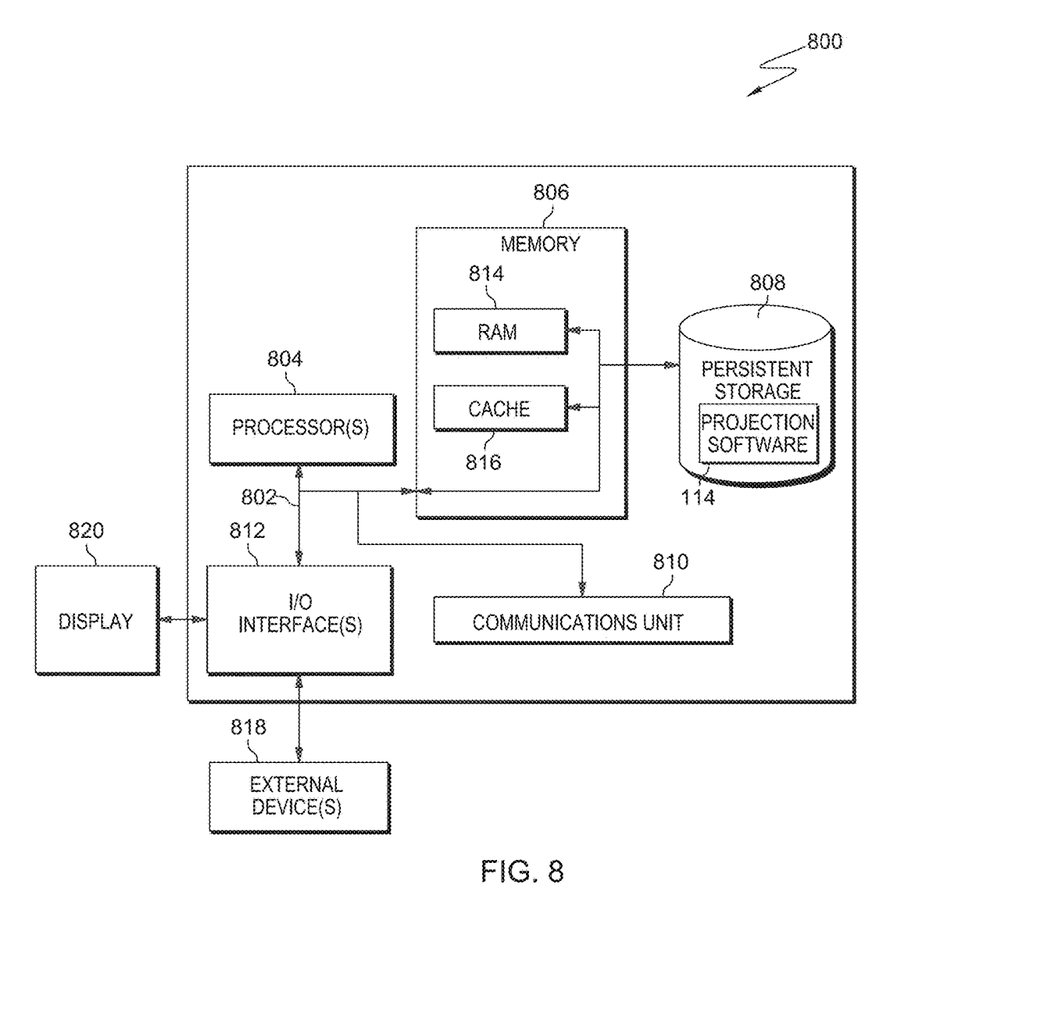
FIG. 8 depicts a block diagram of components of the computer executing the projection software, in an embodiment in accordance with the present invention.

Computer 102 may include internal and external hardware components, as depicted and described in further detail with respect to FIG. 8.

In FIG. 1, network 118 is shown as the interconnecting fabric between computer 102, and server 120. In practice, network 118 may be any viable data transport network. Network 118 can be, for example, a local area network (LAN), a wide area network (WAN) such as the Internet, or a combination of the two, and can include wired, wireless, or fiber optic connections. In general, network 118 can be any combination of connections and protocols that will support communications between computer 102 and server 120 in accordance with an embodiment of the invention. In other example embodiments, projection software 116 may be used to project images for products in software applications that are offline. Stated another way, projection software 116 may be used to project images that are stored locally on computer 102 in image files, or other files and/or applications. For example, a user may open a file document that contains a product image, with or without product dimensions, and display the product in real-size using projection software 116.

E-commerce environment 100 also includes server 120. In this example embodiment of the present invention, server 120 is a device attached to network 118 and capable of communicating with computer 102. Server 120 contains RAM 122, CPU 124, and persistent storage 126. Persistent storage 126 may, for example, be a hard disk drive. Alternatively, or in addition to a magnetic hard disk drive, persistent storage 126 may include a solid state hard drive, a semiconductor storage device, ROM, erasable programmable read-only memory (EPROM), flash memory, or any other computer-readable storage medium that is capable of storing program instructions or digital information. E-commerce web server 128 is stored in persistent storage 126, which also includes operating system software, as well as, software that enables server 120 to communicate with computer 102 over a data connection on network 118. In this example embodiment of the present invention, server 120 is a computer hosting an e-commerce website providing responses to transactions originating from computer 102 on network 118. In other example embodiments, e-commerce web server may utilize projection software APIs and send instructions and images to projector 114 on computer 102 when a user requests to see a product in real-size.

Figure 2A:
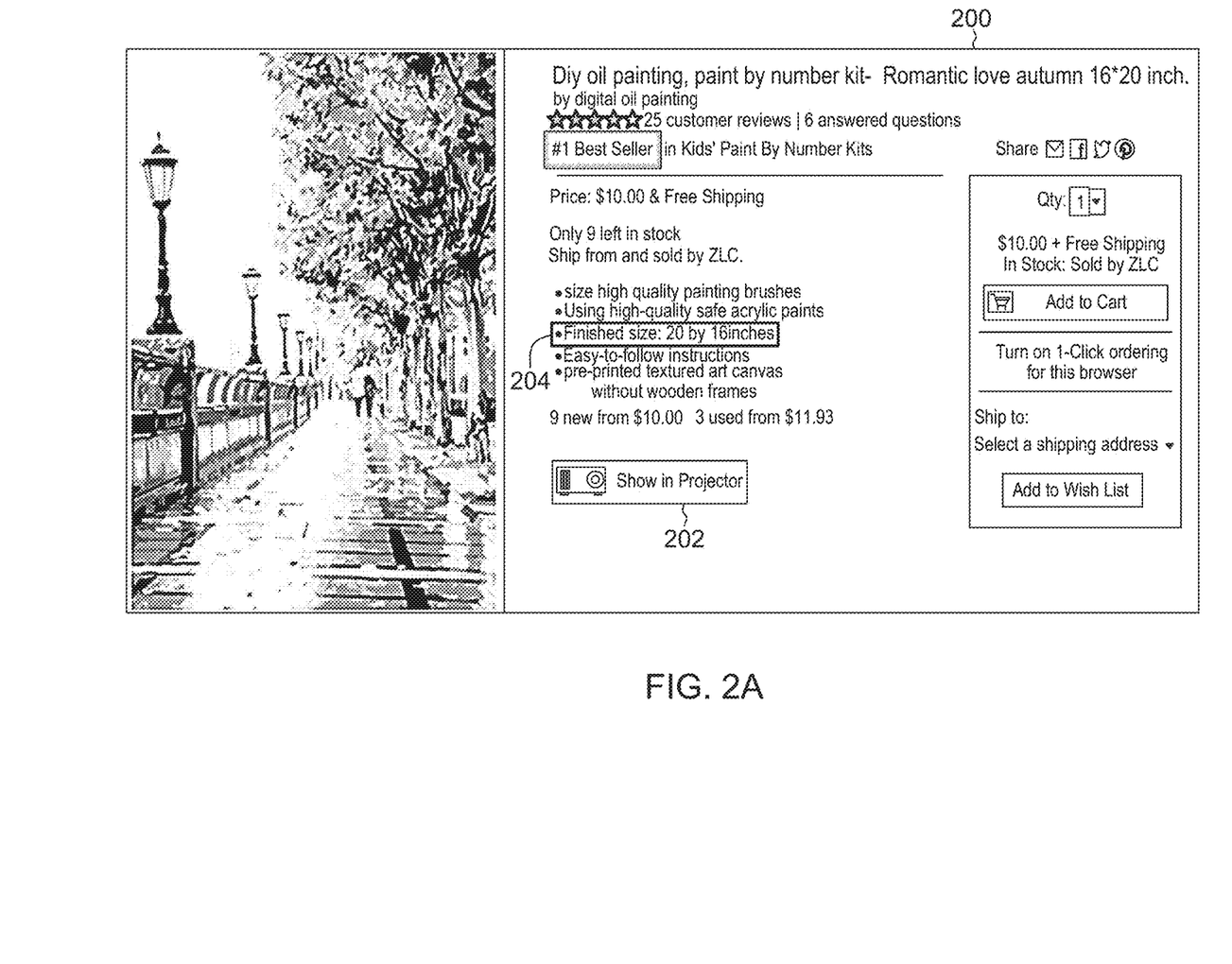
FIG. 2A is an example of an e-commerce graphical user interface incorporating projection software, on a computer within the e-commerce environment of FIG. 1, for enabling a user to project a product image on a selected surface, in an embodiment in accordance with the present invention.

FIG. 2A is an example of an e-commerce graphical user interface, generally designated 200, incorporating projection software, on a computer within the e-commerce environment of FIG. 1, for enabling a user to project a product image on a selected surface, in an embodiment in accordance with the present invention. In an example embodiment, a user using computer 102 and user interface 110, accesses an e-commerce website hosted on server 120 by e-commerce web server 128. The user views a product, such as an oil painting, and would like to view the painting on a wall before deciding to purchase the product. The user clicks the "Show in Projector" button 202 on the web page and projection software 116 parses the web page data that contains the product description to determine one or more product dimensions 204. In one example embodiment, web pages may support projection software 116 by tagging product dimensions 204 allowing projection software 116 to easily find the product dimensions when parsing the web page. In another example embodiment, the HyperText Markup Language (HTML) text may be a clickable link that may send instructions to projector 114 and the instructions may include the product dimensions. HTML is the standard markup language used to create web pages. HTML describes the structure of a website semantically along with cues for presentation, making it a markup language, rather than a programming language. HTML allows images and objects to be embedded and can be used to create interactive forms. It provides a means to create structured documents by denoting structural semantics for text such as headings, paragraphs, lists, links, quotes and other items.

Figure 2B:
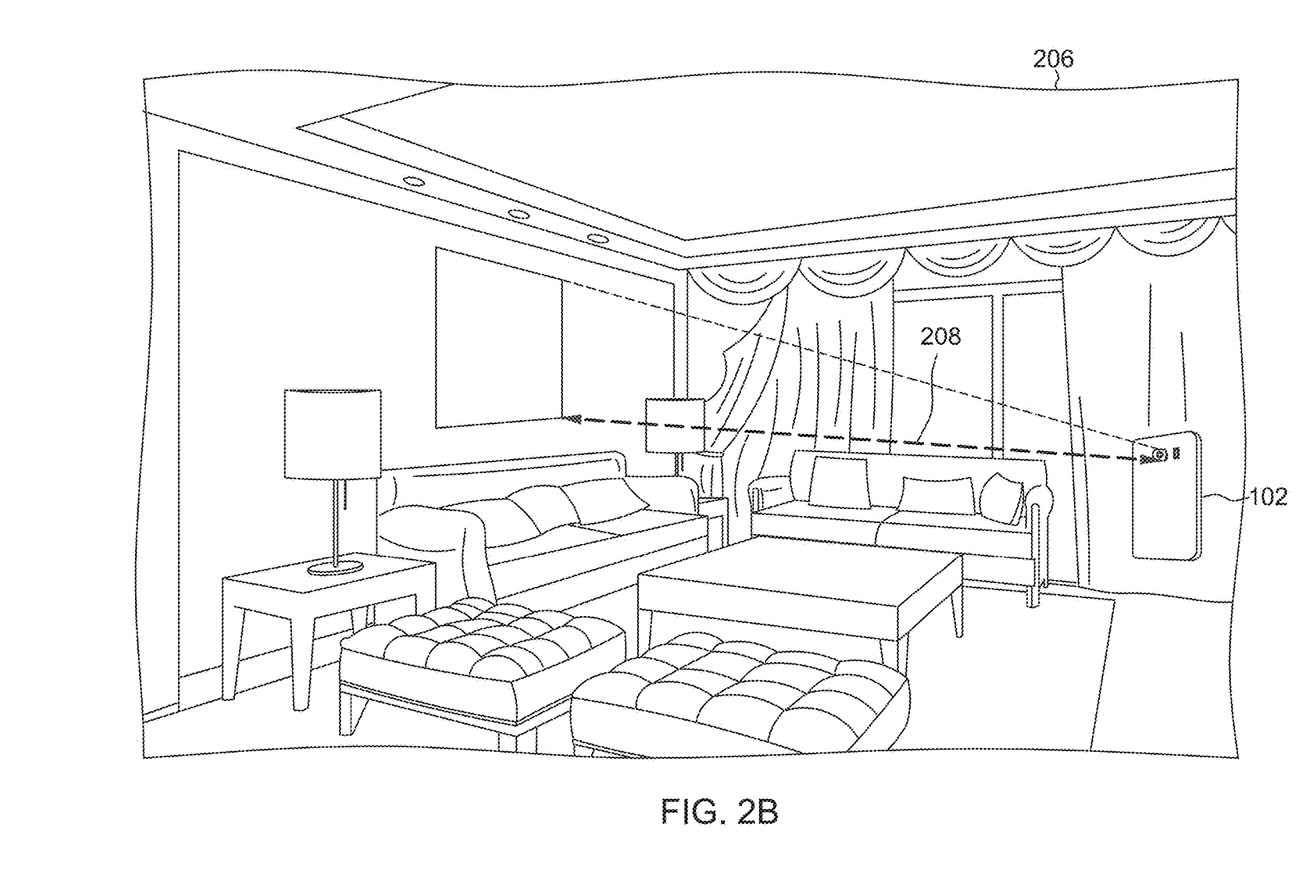
FIG. 2B is a functional block diagram of a computer determining the focal length of a product image on a selected surface, in an embodiment in accordance with the present invention.

Projection software 116 then uses camera 112 to capture an image of the selected surface the image is to be displayed on. Once the image is captured, projection software 116 calculates the distance to the selected surface as depicted in FIG. 2B and reference indicator 208. FIG. 2B is a functional block diagram, generally designated 206, of computer 102 determining the distance (represented by reference indicator 208) to the selected surface, in an embodiment in accordance with the present invention. In this embodiment, the distance between camera 112 and the selected surface may be measured in one of three ways: (i) using camera 112 in computer 102 to detect the distance between the device and the image plane; (ii) using a laser to measure the distance, and/or (iii) using infrared technology to measure the distance. When using camera 112, the distance, also referred to as the object distance, is determined using the following equation:

$$\frac{1}{U} = \frac{1}{F} - \frac{1}{V}$$

In this equation, U is the object distance (i.e., the distance between the camera lens and the selected surface), F is the focal length (i.e., the distance at which the camera is focused), and V is the image distance (i.e. the distance between the camera lens and the camera sensor). When the camera is focused, the focal length F and the image distance V are known and thus the object distance may be calculated.

Figure 2C:
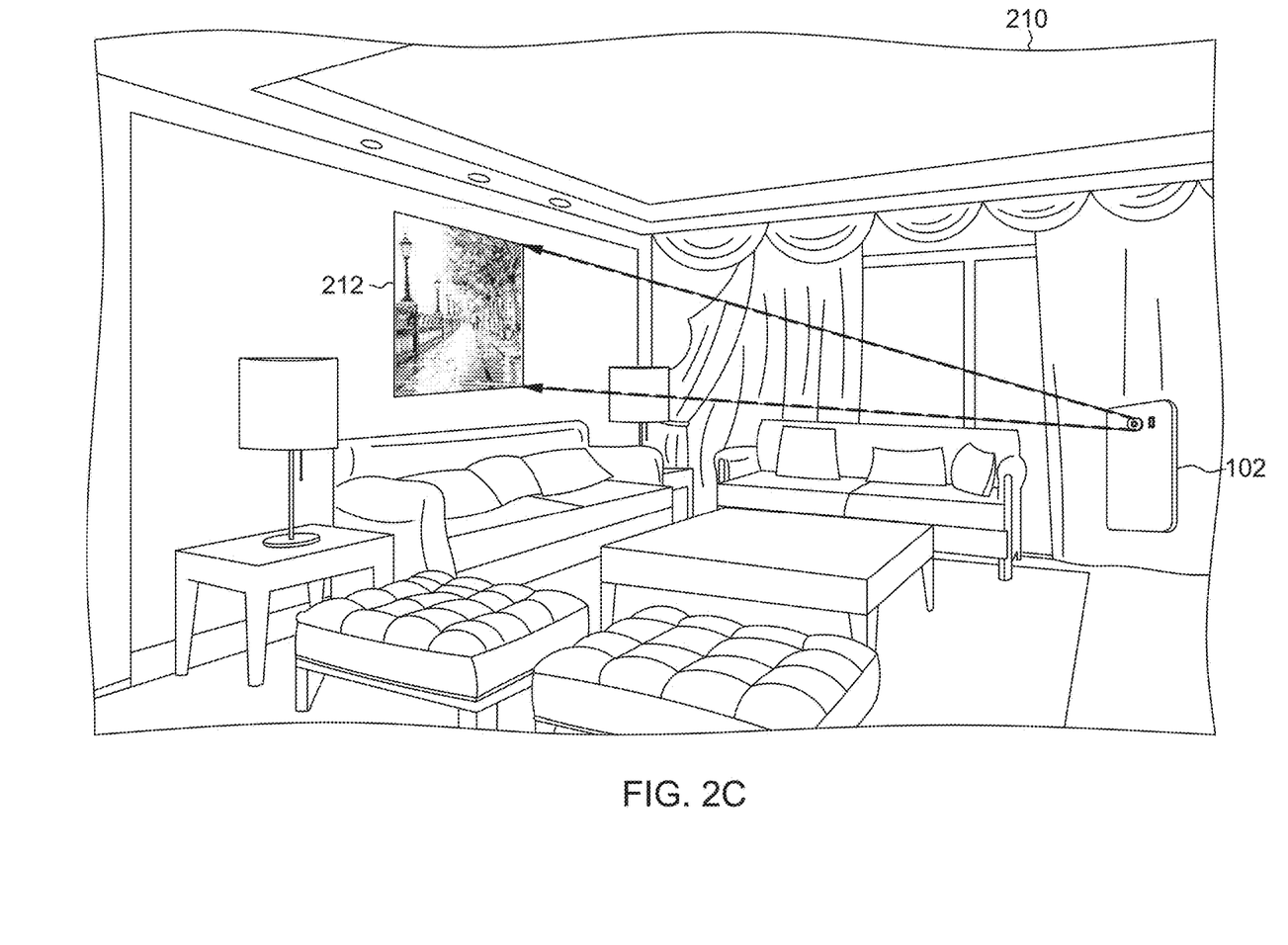
FIG. 2C is a functional block diagram of a computer projecting a product image in real-size on a selected surface, in an embodiment in accordance with the present invention.

Projection software 116 then sends the image and commands to projector 114 to focus and display the image on the selected surface as depicted in FIG. 2C and indicated by 212. FIG. 2C is a functional block diagram of computer 102 projecting product image 212 in real-size on a selected surface, in an embodiment in accordance with the present invention. In another example embodiment, projection software 116 may ask the user if all or a part of the image is to be displayed. If the user only wants to display part of the image, then projection software 116 may prompt the user to enter the dimensions or select the portion of the image to show using user interface 110.

Figure 3:
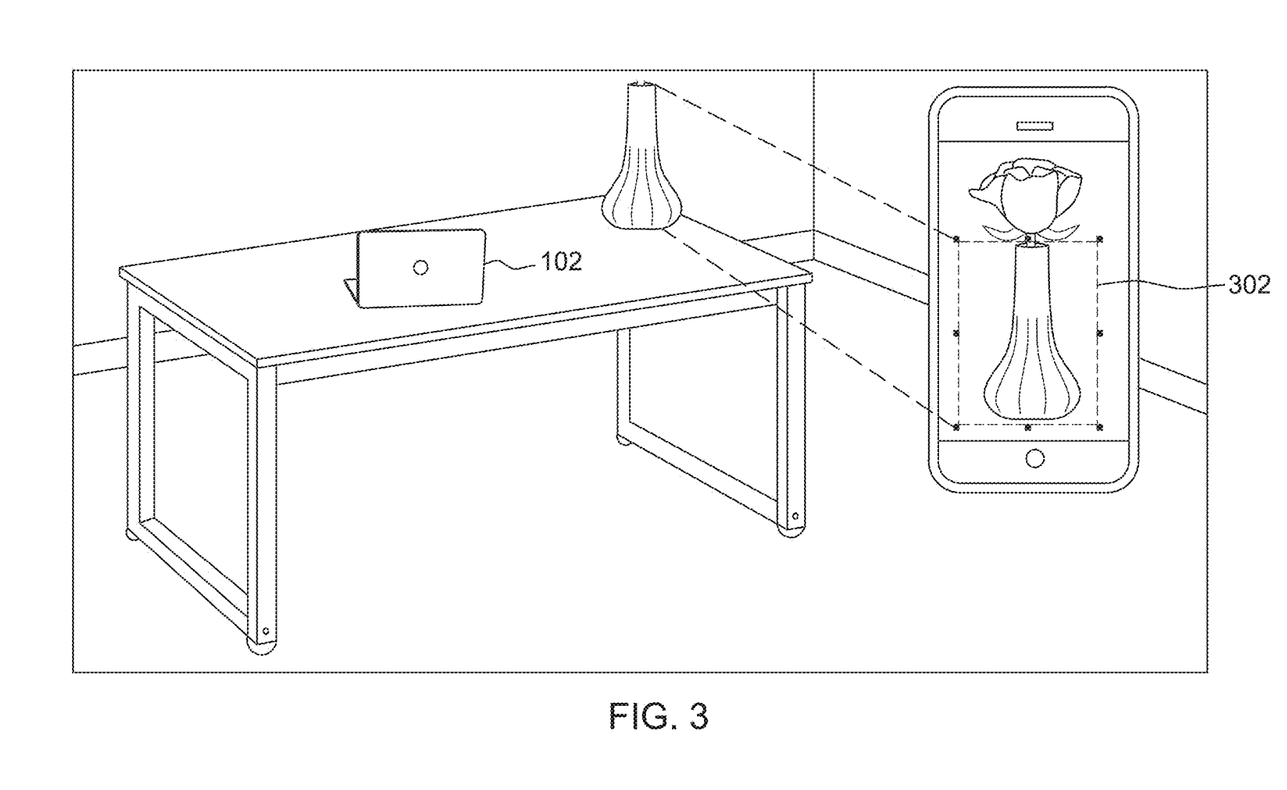
FIG. 3 is a functional block diagram of a computer projecting a portion of a product image in real-size on a selected surface, in an embodiment in accordance with the present invention.

FIG. 3 is a functional block diagram, generally designated 300, of a computer projecting a portion of a product image in real-size on a selected surface, in an embodiment in accordance with the present invention. In this example embodiment, a user using computer 102 and user interface 110, accesses an e-commerce website hosted on server 120 by e-commerce web server 128. The user views a product, such as a vase, and would like to view only the portion of the image containing the vase on a wall before deciding to purchase the product. The user frames, or selects, only the portion on the image containing the vase, as depicted in 302, then clicks the "Show in Projector" button 202 on the web page. Projection software 116 parses the web page for the product dimensions and prompts the user for the product dimensions if the dimensions are not found. Upon entering the dimensions, projection software 116 determines the distance to the selected surface using camera 112 then projects the image of the vase as depicted in FIG. 3.

Figure 4:
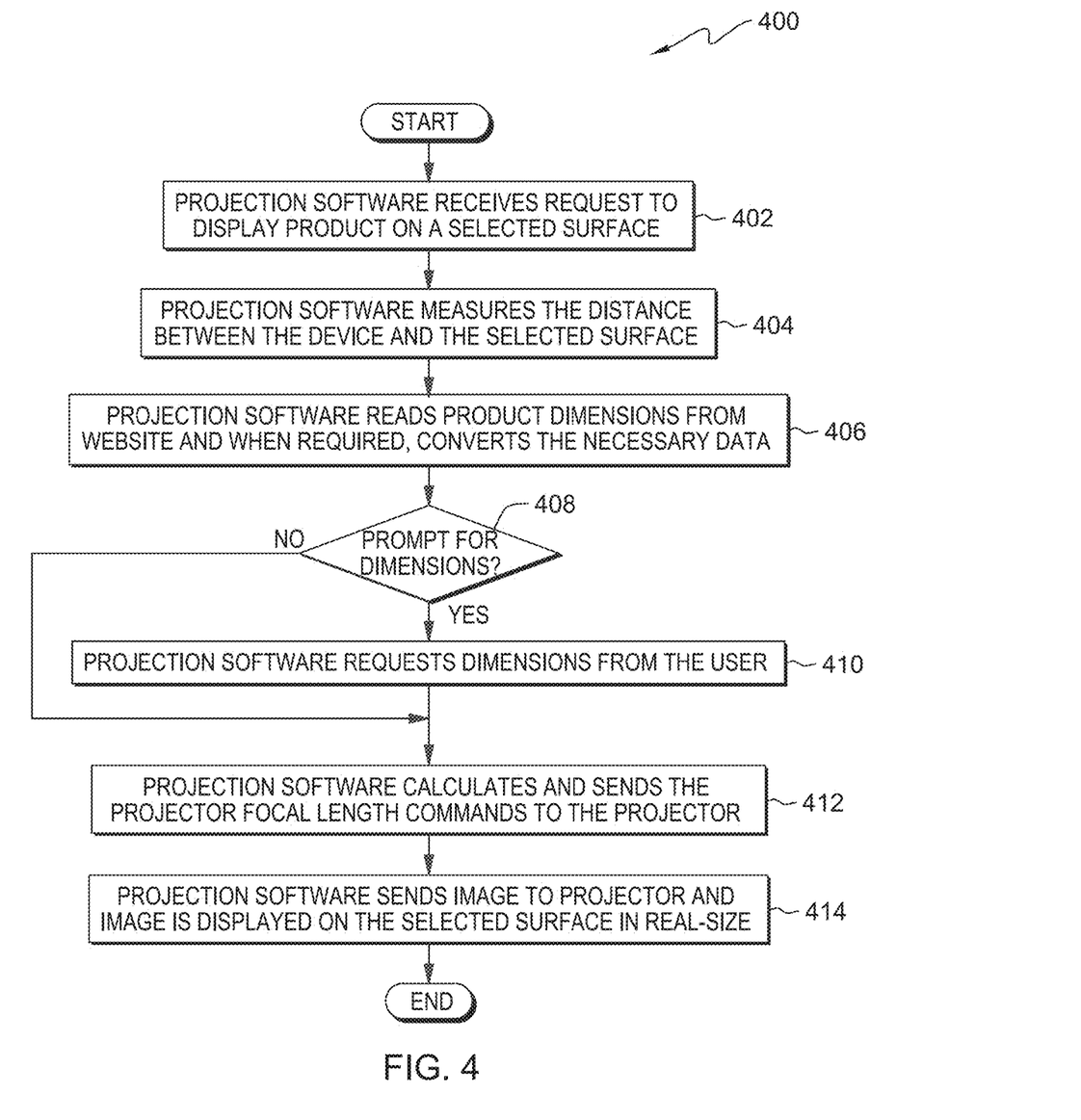
FIG. 4 is a flowchart depicting operational steps of projection software, performing operations to project an image on a selected surface within the e-commerce environment of FIG. 1, in an embodiment in accordance with the present invention.

FIG. 4 is a flowchart, generally designated 400, depicting operational steps of projection software, performing operations to project an image on a selected surface within the e-commerce environment of FIG. 1, in an embodiment in accordance with the present invention. In an example embodiment, projection software 116 receives a request to display a product image on a selected surface as depicted in step 402. For example, a user may select multiple portions of a product image, or multiple products, on a selected surface. In other example embodiments, projection software 116 and projector 114 may be contained in a networked shared computing device capable of displaying product images for any computing device within e-commerce environment 100.

In step 404, projection software 116 measures the distance between computer 102 and the selected surface. The distance is measured using one of the methods described previously in relation to FIG. 2B. For example, projection software 116 may use camera 112 to capture an image of the selected surface and calculate the distance using the focal length and image distance. In another example, projection software 116 may employ a laser device (not shown) to measuring the time it takes for light emitted from the laser to reflect off the desired surface return back to computer 102.

Projection software 116 then reads the product dimensions from the website and converts the data if necessary as depicted in step 406. For example, the product dimensions may be in metric form, however, the user wants the image to be displayed in inches on the selected surface. In one example embodiment, projection software 116 may be configured for any standard unit of measurement and store the user's preferences to be used when displaying images. Projection software 116 may obtain product dimensions by parsing the webpage and/or a web form to determine the product dimensions. In other example embodiments, projection software 116 may read product dimensions from any software application, such as a word processor application. In another example embodiment, projection software 116 may read product images and product dimensions from any file format located on computer 102 or another computing device (not shown) in e-commerce environment 100, such as a JPEG, GIF, or PDF.

In decision step 408, projection software determines if the product dimensions need to be entered by the user. For example, the user may have selected only a portion of the image using user interface 110 and would like the image displayed using a certain size. If projection software 116 is required to prompt for the product dimensions ("Yes" branch, decision 408), projection software 116 requests the dimensions from the user as depicted in step 410. If projection software 116 is not required to prompt for the product dimensions ("No" branch, decision 408), projection software 116 calculates and sends the projector focal length commands (i.e. commands to adjust the projector to the proper focal length) to projector 114 as depicted in step 412. Details for calculating and adjusting the projector focal length are described in further detail with respect to FIG. 6 and FIG. 7.

In step 414, projection software 116 sends the product image to projector 114 and the image is displayed on the selected surface in real-size. In other example embodiments, projection software 116 may allow a user to display multiple images together using projector 114 and rearrange the product images to allow for different arrangements and/or positions.

Figure 5:
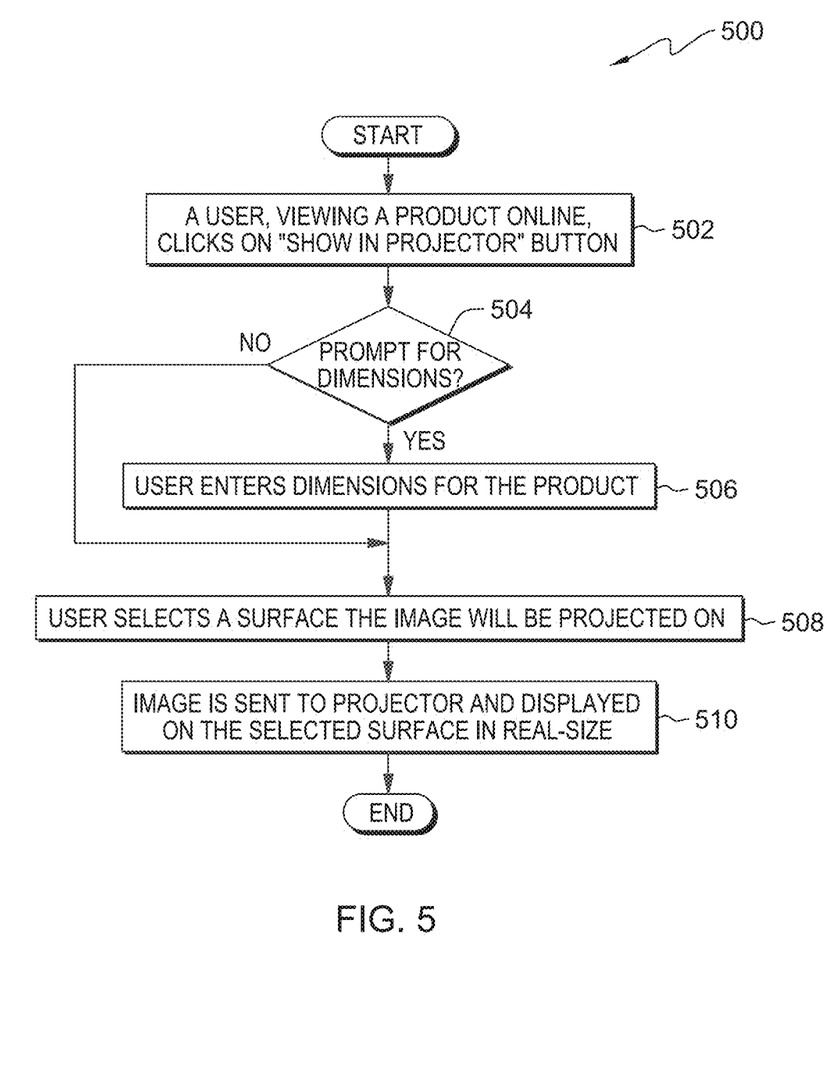
FIG. 5 is a flowchart depicting operational steps a user would perform in an e-commerce application, to project an image of a product on a selected surface within the e-commerce environment of FIG. 1, in an embodiment in accordance with the present invention.

FIG. 5 is a flowchart, generally designated 500, depicting operational steps a user would perform in an e-commerce application, to project an image of a product on a selected surface within the e-commerce environment of FIG. 1, in an embodiment in accordance with the present invention. In an example embodiment, a user, using computer 102 and user interface 110, views a product online and decides to view the product in real-size and clicks the "Show in Projector" as depicted in step 502. Projection software 116 then receives the request to display the product image on a selected surface as depicted in step 402 of FIG. 4.

In decision step 504, the user may receive a prompt by projection software 116 asking for the dimensions of the product for at least one of the following reasons: (i) projection software 116 is unable to determine the product dimensions using the product information on the website, or (ii) the user has framed or selected only a portion of the product image on the website to be displayed on the selected surface. In other example embodiments, projection software 116 may always verify the product dimensions with the user, regardless if the product dimensions were found or not. If projection software 116 prompts for the product dimensions ("Yes" branch, decision 504), the user is prompted to enter the product dimensions for the product as depicted in step 506. Projection software 116 receives the requested dimensions from the user as depicted in step 410 of FIG. 4. If projection software 116 does not prompt for the product dimensions ("No" branch, decision 504), the user selects a surface the product image will be displayed on as depicted in step 508. In step 510, projection software 116 sends the image to projector 114 and the image is displayed on the selected surface in real-size.

Figure 6:
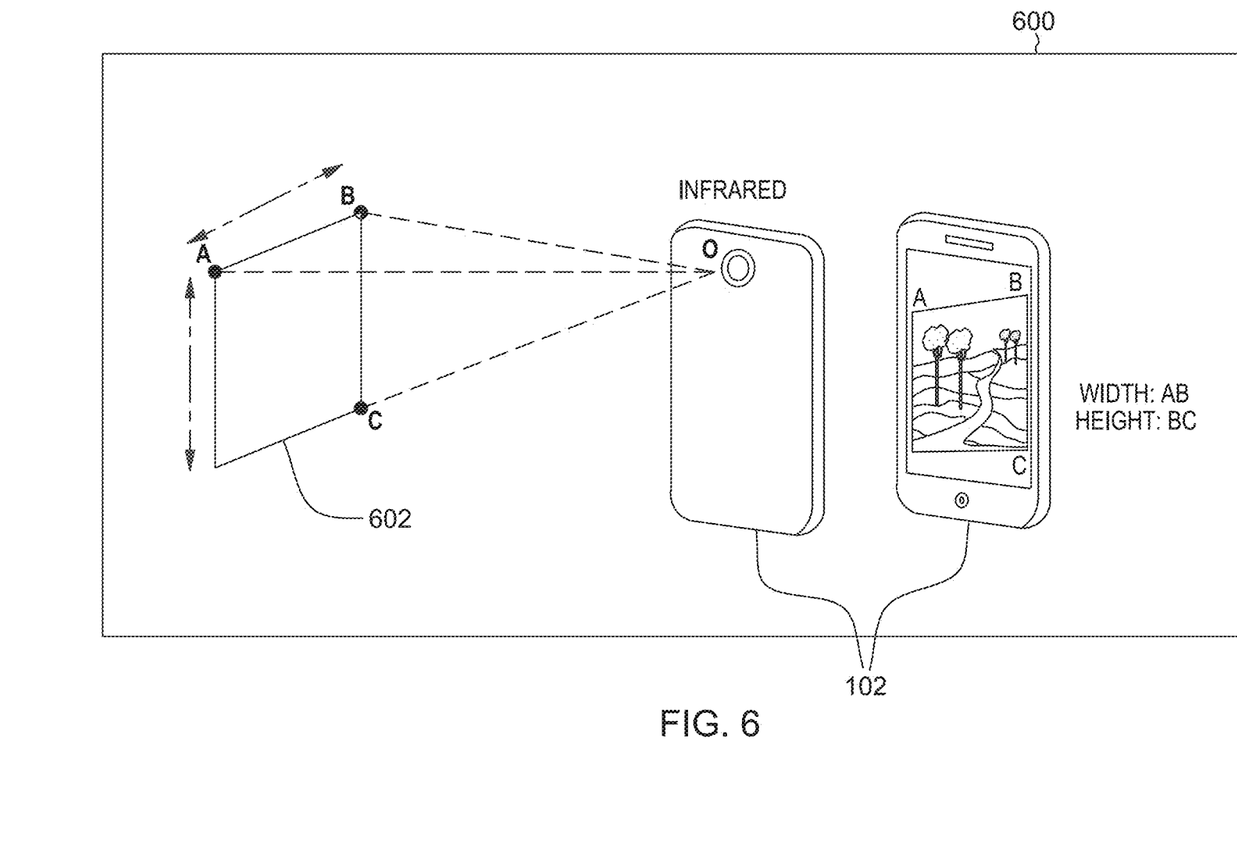
FIG. 6 is a functional block diagram of a computer calculating and adjusting the focal length for a projector using three projected movable red spots, in an embodiment in accordance with the present invention.

In the example embodiment of FIG. 6, generally designated 600, computer 102 is not able to project entire images, but rather is able to project circular "spots" (using, for example, a camera flash and/or lasers) on the selected surface. In this case, projection software 116 may calculate and adjust the focal length of a product image and project three movable spots 602 using the product's height and width. Projection software 116 first determines distance (OB) between computer 102 and the selected surface (B) as depicted by point (OB) in FIG. 6. Projection software then then determines, using the online product description or by manual input from the user, the product height (BC) and the product width (AB). Keeping point (B) stationary on the selected surface, projection software 116 may then move point (A) and point (C) based on the determined height and width from the product description or entered by the user. Using the three position points (OB, BC, and AB), projection software 116 may then project and adjust the three movable spots 602 on the selected surface to correspond with the product's real size.

Figure 7:
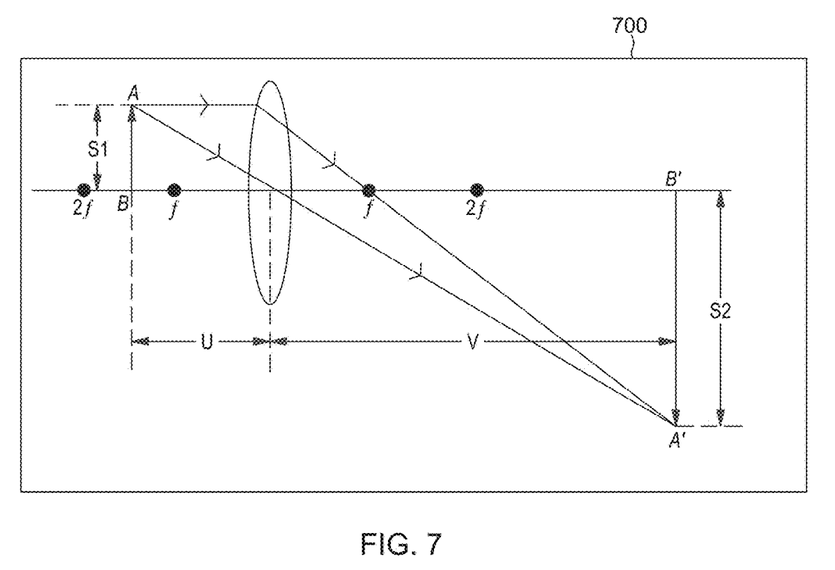
FIG. 7 is a functional block diagram of a computer calculating and adjusting the focal length for a projector, in an embodiment in accordance with the present invention.

FIG. 7 is a functional block diagram, generally designated 700, of a computer calculating and adjusting the projector focal length of a product image for a projector, in an embodiment in accordance with the present invention. In the example embodiment, projection software 116 determines the image size S1 by parsing the product description, or by being manually entered by a user when selecting a portion of the product in the original picture as described in step 406 of FIG. 4. Projection software 116 also determines the product's real size S2 and the image distance V during the measurement phase described in step 412 of FIG. 4. The object distance U, described in FIG. 2 can be determined using the following formula:

$$\frac{V}{U} = \frac{S2}{S1}$$

In the preceding formula, V is the image distance, U is the object distance, S2 is the real size of the image, and S1 is the image size from the original picture. The projector focal length (or "focus") F can then be found for projector 114 using the formula previously described in relation to FIG. 2:

$$\frac{1}{F} = \frac{1}{U} + \frac{1}{V}$$

Using the formula V/U=S2/S1, and the values for S2, S1 and V being known values, the projector focus F may be determined by substituting the known values into the above formula. For example, the following formula is the result of replacing 1/U in the above formula with 1/V*S2/S1:

$$\frac{1}{F} = \frac{1}{V} * \left(1 + \frac{S2}{S1}\right)$$

Upon determining projector 114's focus F, projection software 116 will adjust projector 114's focus F, then project the image to the selected surface. Finally, the real sized picture projected on the selected surface may be viewed by the user. In another example embodiment, where the calculated focus F is not within the actual projector's focus length, projection software 116 will prompt the user via warning messages. For example, if computer 102 is moved closer to the selected surface, projection software 116 may display a pop-up message on user interface 110 stating "Please move away from the selected surface". If computer 102 is moved away from the selected surface, projection software 116 may display a pop-up message on user interface 110 stating "Please move closer to the selected surface".

FIG. 8 is a block diagram, generally designated 800, of components of the computer executing the projection software, in an embodiment in accordance with the present invention. It should be appreciated that FIG. 8 provides only an illustration of one implementation and does not imply any limitations with regard to the environments in which different embodiments may be implemented. Many modifications to the depicted environment may be made.

Computer 102 includes communications fabric 802, which provides communications between computer processor(s) 804, memory 806, persistent storage 808, communications unit 810, and input/output (I/O) interface(s) 812. Communications fabric 802 can be implemented with any architecture designed for passing data and/or control information between processors (such as microprocessors, communications and network processors, etc.), system memory, peripheral devices, and any other hardware components within a system. For example, communications fabric 802 can be implemented with one or more buses.

Memory 806 and persistent storage 808 are computer readable storage media. In this embodiment, memory 806 includes RAM 814 and cache memory 816. In general, memory 806 can include any suitable volatile or non-volatile computer readable storage media.

Projection software 116 is stored in persistent storage 808 for execution by one or more of the respective computer processors 804 via one or more memories of memory 806. In this embodiment, persistent storage 808 includes a magnetic hard disk drive. Alternatively, or in addition to a magnetic hard disk drive, persistent storage 808 can include a solid state hard drive, a semiconductor storage device, ROM, erasable programmable read-only memory (EPROM), flash memory, or any other computer readable storage media that is capable of storing program instructions or digital information.

The media used by persistent storage 808 may also be removable. For example, a removable hard drive may be used for persistent storage 808. Other examples include optical and magnetic disks, thumb drives, and smart cards that are inserted into a drive for transfer onto another computer readable storage medium that is also part of persistent storage 808.

Communications unit 810, in these examples, provides for communications with other data processing systems or devices, including resources of network 118 and server 120. In these examples, communications unit 810 includes one or more network interface cards. Communications unit 810 may provide communications through the use of either or both physical and wireless communications links. Projection software 116 may be downloaded to persistent storage 808 through communications unit 810.

I/O interface(s) 812 allows for input and output of data with other devices that may be connected to computer 102. For example, I/O interface 812 may provide a connection to external devices 818 such as a keyboard, keypad, a touch screen, and/or some other suitable input device. External devices 818 can also include portable computer readable storage media such as, for example, thumb drives, portable optical or magnetic disks, and memory cards. Software and data used to practice embodiments of the present invention, e.g., projection software 116, can be stored on such portable computer readable storage media and can be loaded onto persistent storage 808 via I/O interface(s) 812. I/O interface(s) 812 also connect to a display 820.

Display 820 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for viewing images of items in real-size, the method comprising:
    displaying, by one or more processors, a web user interface that includes a product image containing a plurality of products, wherein the web user interface is displayed on a touch screen of a mobile device;
    prompting, by one or more processors, a user to frame one or more portions of the product image using the touch screen of the mobile device;
    receiving, by one or more processors, selected portions of the product image framed by the user, wherein the selected portions include multiple products of the plurality of products contained in the product image;
    receiving, by one or more processors, one or more instructions to display the selected portions of the product image on a selected surface, based on the user indicating that the selected portions of the product image are to be displayed on the selected surface;
    determining, by one or more processors, one or more dimensions of the products included in the selected portions of the product image; and
    sending, by one or more processors, instructions to project the selected portions of the product image on the selected surface, wherein one or more dimensions of the projected image are equal to the one or more dimensions of the products included in the selected portions of the product image.

2. The method of claim 1, wherein the instructions to project the selected portions of the product image on the selected surface are sent to an electronic device capable of projection.

3. The method of claim 2, further comprising:
    measuring, by one or more processors, a distance between the electronic device and the selected surface.

4. The method of claim 3, further comprising:
    calculating, by one or more processors, a focal length for the electronic device to project the selected portions of the product image on the selected surface.

5. The method of claim 4, wherein projecting the selected portions of the product image on the selected surface is based, at least in part, on the determined one or more dimensions of the products included in the selected portions of the product image, the measured distance, and the calculated focal length.

6. A method for viewing images of items in real-size, the method comprising:
    displaying, by one or more processors, a web user interface that includes a product image containing a plurality of products, wherein the web user interface is displayed on a touch screen of a mobile device;
    prompting, by one or more processors, a user to frame one or more portions of the product image using the touch screen of the mobile device;
    receiving, by one or more processors, selected portions of the product image framed by the user, wherein the selected portions include multiple products of the plurality of products contained in the product image;
    receiving, by one or more processors, one or more instructions to display the selected portions of the product image on a selected surface using an electronic device capable of projection, based on the user indicating that the selected portions of the product image are to be displayed on the selected surface;
    determining, by one or more processors, one or more dimensions of the products included in the selected portions of the product image;
    measuring, by one or more processors, a distance between the electronic device and the selected surface;
    calculating, by one or more processors, a projection focal length for the electronic device to project the selected portions of the product image on the selected surface; and
    sending, by one or more processors, instructions to project the selected portions of the product image on the selected surface using the determined one or more dimensions of the products included in the selected portions of the product image, the measured distance, and the calculated focal length, wherein one or more dimensions of the projected image are equal to the one or more dimensions of the products included in the selected portions of the product image.

7. The method of claim 6, wherein determining one or more dimensions of the products included in the selected portions of the product image comprises:
    parsing, by one or more processors, a description of the products included in the selected portions of the product image; and
    determining, by one or more processors, whether the parsed description includes one or more dimensions of the products included in the selected portions of the product image.

8. The method of claim 7, wherein determining one or more dimensions of the products included in the selected portions of the product image further comprises:
    in response to determining that the parsed description does not include any dimensions of the products included in the selected portions of the product image, prompting, by one or more processors, a user to manually input the one or more dimensions.

9. The method of claim 6, wherein measuring a distance between the electronic device and the selected surface comprises:
    capturing, by one or more processors, an image using a camera installed in the electronic device, wherein the camera is focused on the selected surface;
    retrieving, by one or more processors, a camera focal length and a camera image distance used by the camera to capture the selected portions of the product image; and
    calculating, by one or more processors, the distance between the electronic device and the selected surface, using the retrieved camera focal length and camera image distance.

10. The method of claim 6, wherein calculating a projection focal length for the electronic device to project the selected portions of the product image on the selected surface further comprises:
    determining, by one or more processors, one or more dimensions of the selected portions of the product image; and
    calculating, by one or more processors, the projection focal length using the determined one or more dimensions of the selected portions of the product, the determined one or more dimensions of the selected portions of the product image, and the measured distance between the electronic device and the selected surface.

11. A method for viewing images of items in real-size, the method comprising:
    displaying, by one or more processors, a web user interface that includes a product image containing a plurality of products, wherein the web user interface is displayed on a touch screen of a mobile device;

prompting, by one or more processors, a user to frame one or more portions of the product image using the touch screen of the mobile device;

receiving, by one or more processors, the selected portions of the product image framed by the user, wherein the selected portions include multiple products of the plurality of products contained in the product image;

receiving, by one or more processors, one or more instructions to display the selected portions of the product image on a selected surface using an electronic device capable of projection, based on the user indicating that the selected portions of the product image are to be displayed on the selected surface;

determining, by one or more processors, one or more dimensions of the products included in the selected portions of the product image, wherein the one or more dimensions of the products included in the selected portions of the product image are parsed from one of: a product description of the products included in the selected portions of the product image and a framed area selected by a user;

capturing, by one or more processors, an image using a camera installed in the electronic device, wherein the camera is focused on the selected surface;

retrieving, by one or more processors, a camera focal length and an camera image distance used by the camera to capture the selected portions of the product image;

calculating, by one or more processors, the distance between the electronic device and the selected surface, using the retrieved camera focal length and camera image distance;

determining, by one or more processors, one or more dimensions of the products included in the selected portions of the product image;

calculating, by one or more processors, a projection focal length using the determined one or more dimensions of the selected portions of the product, the determined one or more dimensions of the selected portions of the product image, and the calculated distance between the electronic device and the selected surface; and sending, by one or more processors, instructions to project the selected portions of the product image on the selected surface using the determined one or more dimensions of the products included in the selected portions of the product image, the calculated distance, and the calculated projection focal length, wherein one or more dimensions of the projected image are equal to the determined one or more dimensions of the products included in the selected portions of the product image.

12. A computer program product for viewing images of items in real-size, the computer program product comprising:

one or more computer readable storage media and program instructions stored on the one or more computer readable storage media, the program instructions comprising:

program instructions to display a web user interface that includes a product image containing a plurality of products, wherein the web user interface is displayed on a touch screen of a mobile device;

program instructions to prompt a user to frame one or more portions of the product image using the touch screen of the mobile device;

program instructions to receive the selected portions of the product image framed by the user, wherein the selected portions include multiple products of the plurality of products contained in the product image;

program instructions to receive one or more instructions to display the selected portions of the product image on a selected surface using an electronic device capable of projection, based on the user indicating that the selected portions of the product image are to be displayed on the selected surface;

program instructions to determine one or more dimensions of the products included in the selected portions of the product image;

program instructions to measure a distance between the electronic device and the selected surface;

program instructions to calculate a projection focal length for the electronic device to project the selected portions of the product image on the selected surface; and program instructions to send instructions to project the selected portions of the product image on the selected surface, wherein one or more dimensions of the projected image are equal to the determined one or more dimensions of the products included in the selected portions of the product image.

13. The computer program product of claim 12, wherein the selected portions of the product image is a plurality of online products.

14. The computer program product of claim 12, wherein the program instructions to measure a distance between the electronic device and the selected surface comprise:

program instructions to capture an image using a camera installed in the electronic device, wherein the camera is focused on the selected surface;

program instructions to retrieve a camera focal length and a camera image distance used by the camera to capture the selected portions of the product image; and program instructions to calculate the distance between the electronic device and the selected surface, using the retrieved camera focal length and camera image distance.

15. The computer program product of claim 12, wherein the program instructions to calculate a projection focal length for the electronic device to project the selected portions of the product image on the selected surface further comprise:

program instructions to determine one or more dimensions of the products included in the selected portions of the product image; and program instructions to calculate the projection focal length using the determined one or more dimensions of the selected portions of the product image, the determined one or more dimensions of the selected portions of the product image, and the measured distance between the electronic device and the selected surface.

16. The computer program product of claim 15, wherein projecting the selected portions of the product image on the selected surface is based, at least in part, on the determined one or more dimensions of the selected portions of the product image, the measured distance, and the calculated focal length.

17. The computer program product of claim 12, wherein the program instructions to determine one or more dimensions of the products included in the selected portions of the product image comprise:

program instructions to parse a description of the products included in the selected portions of the product image; and program instructions to determine whether the parsed description includes one or more dimensions of the products included in the selected portions of the product image.

18. The computer program product of claim 17, wherein the program instructions to determine one or more dimensions of the products included in the selected portions of the product image further comprises:
program instructions to, in response to determining that the parsed description does not include any dimensions of the products included in the selected portions of the product image, prompt a user to manually input the one or more dimensions.

19. A computer system for viewing images of items in real-size, the computer system comprising:
one or more computer processors;
one or more computer readable storage media;
program instructions stored on the computer readable storage media for execution by at least one of the one or more processors, the program instructions comprising:
program instructions to display a web user interface that includes a product image containing a plurality of products, wherein the web user interface is displayed on a touch screen of a mobile device;
program instructions to prompt a user to frame one or more portions of the product image using the touch screen of the mobile device;
program instructions to receive the selected portions of the product image framed by the user, wherein the selected portions include multiple products of the plurality of products contained in the product image;
program instructions to receive one or more instructions to display the selected portions of the product image on the selected surface using an electronic device capable of projection, based on the user indicating that the selected portions of the product image are to be displayed on the selected surface;
program instructions to determine one or more dimensions of the products included in the selected portions of the product image;
program instructions to measure a distance between the electronic device and the selected surface;
program instructions to calculate a projection focal length for the electronic device to project the selected portions of the product image on the selected surface; and
program instructions to send instructions to project the selected portions of the product image on the selected surface, wherein one or more dimensions of the projected image are equal to the one or more dimensions of the products included in the selected portions of the product image.

20. The computer system of claim 19, wherein the selected portions of the product image is a plurality of online products.

21. The computer system of claim 19, wherein the program instructions to measure a distance between the electronic device and the selected surface comprise:
program instructions to capture an image using a camera installed in the electronic device, wherein the camera is focused on the selected surface;
program instructions to retrieve a camera focal length and a camera image distance used by the camera to capture the selected portions of the product image; and
program instructions to calculate the distance between the electronic device and the selected surface, using the retrieved camera focal length and camera image distance.

22. The computer system of claim 19, wherein the program instructions to calculate a projection focal length for the electronic device to project the selected portions of the product image on the selected surface further comprise:
program instructions to determine one or more dimensions of the products included in the selected portions of the product image; and
program instructions to calculate the projection focal length using the determined one or more dimensions of the selected portions of the product image, the determined one or more dimensions of the selected portions of the product image, and the measured distance between the electronic device and the selected surface.

23. The computer system of claim 22, wherein projecting the selected portions of the product image on the selected surface is based, at least in part, on the determined one or more dimensions of the selected portions of the product image, the measured distance, and the calculated focal length.

24. The computer system of claim 19, wherein the program instructions to determine one or more dimensions of the products included in the selected portions of the product image comprise:
program instructions to parse a description of the products included in the selected portions of the product image; and
program instructions to determine whether the parsed description includes one or more dimensions of the products included in the selected portions of the product image.

25. The computer system of claim 24, wherein the program instructions to determine one or more dimensions of the products included in the selected portions of the product image further comprise:
program instructions to, upon determining that the parsed description does not include any dimensions of the products included in the selected portions of the product image, prompt a user to manually input the one or more dimensions.

* * * * *